United States Patent
Tirio

(10) Patent No.: US 8,414,689 B2
(45) Date of Patent: Apr. 9, 2013

(54) PROCESS AND APPARATUS FOR CARBON DIOXIDE CAPTURE VIA ION EXCHANGE RESINS

(75) Inventor: Anthony P. Tirio, Pittsburgh, PA (US)

(73) Assignee: LANXESS Sybron Chemicals Inc., Birmingham, NJ (US)

( * ) Notice: Subject to any disclaimer, the term of this patent is extended or adjusted under 35 U.S.C. 154(b) by 300 days.

(21) Appl. No.: 12/900,882

(22) Filed: Oct. 8, 2010

(65) Prior Publication Data

US 2011/0088550 A1 Apr. 21, 2011

Related U.S. Application Data

(60) Provisional application No. 61/252,838, filed on Oct. 19, 2009.

(51) Int. Cl.
*B01D 53/02* (2006.01)
*B01J 41/04* (2006.01)

(52) U.S. Cl. .............................. 95/96; 95/139; 423/230

(58) Field of Classification Search .............. 95/96, 114, 95/115, 139, 148; 423/220, 226–228, 230
See application file for complete search history.

(56) References Cited

U.S. PATENT DOCUMENTS

| | | | |
|---|---|---|---|
| 3,466,138 A | | 9/1969 | Spiegler et al. |
| 3,659,400 A | * | 5/1972 | Kester ................ 95/96 |
| 4,419,245 A | | 12/1983 | Barrett et al. |
| 4,427,794 A | | 1/1984 | Lange et al. |
| 4,444,961 A | | 4/1984 | Timm |
| 5,797,979 A | * | 8/1998 | Quinn ................ 95/97 |
| 6,279,576 B1 | | 8/2001 | Lambert |
| 2006/0173083 A1 | | 8/2006 | Klipper et al. |
| 2010/0095842 A1 | * | 4/2010 | Lackner et al. ............. 95/107 |

FOREIGN PATENT DOCUMENTS

| | | |
|---|---|---|
| GB | 1296889 | 11/1972 |
| WO | 9312167 A1 | 6/1993 |

OTHER PUBLICATIONS

International Search Report from co-pending Application PCT/US2010/051963 dated Jan. 17, 2011, 10 pages.
Zhang X et al; "Studiesd on the kinetics of carbon dioxide absorption with immobilized amines (IA)"; Chemical Engineering Journal, vol. 107, No. 1-3, Mar. 15, 2005, pp. 97-102.

\* cited by examiner

*Primary Examiner* — Frank Lawrence, Jr.
(74) *Attorney, Agent, or Firm* — Nicanor A. Kohncke

(57) ABSTRACT

A process for the reduction of carbon dioxide (or $CO_2$) from various types of gas emitting sources containing carbon dioxide, including the reduction of carbon dioxide from industrial gas emitting sources via the use of an ion exchange material.

12 Claims, No Drawings

PROCESS AND APPARATUS FOR CARBON DIOXIDE CAPTURE VIA ION EXCHANGE RESINS

This application claims the benefit of U.S. Provisional Application No. 61/252,838, filed Oct. 19, 2009.

The present invention relates to the removal of carbon dioxide (or $CO_2$) from various types of gas emitting sources containing carbon dioxide, especially to the removal of carbon dioxide from industrial gas emitting sources, via the use of an ion exchange material.

Applicant has now found the use of an ion exchange material comprising an aminoalkylated bead polymer in the removal of carbon dioxide from industrial applications, as compared to other materials often used in general carbon dioxide removal applications.

There is broadly contemplated, in accordance with at least one embodiment of the present invention, a process for removing carbon dioxide from a carbon dioxide containing gas stream, comprising: providing an ion exchange resin, contacting said ion exchange resin with said carbon dioxide containing gas stream, sorbing a portion of said carbon dioxide from the carbon dioxide containing gas stream by the ion exchange resin, thereby forming a carbon-dioxide-form ion exchange resin, and de-sorbing the attached carbon-dioxide from the carbon-dioxide-form ion exchange resin, thereby increasing the capacity of the ion exchange resin to re-sorb carbon dioxide.

In another embodiment, the ion exchange resin employed is a weakly basic ion exchange resin. In another embodiment, said ion exchange resin is a polystyrene polymer based resin, which is crosslinked via the use of divinylbenze, and is functionalized with primary amine groups including benzylamine and wherein the resin is produced by a phthalimide process.

In another embodiment of the invention, the aforementioned gas stream is an industrial gas and/or industrial gas stream, such as flue gas streams, hydrocarbon combustion gas streams, natural gas, produced gas, cracked gas, and synthesis gas streams. In yet another embodiment, the carbon dioxide of said industrial gas and/or gas stream has a partial pressure above 0.05 kPA.

For a better understanding of the present invention, together with other and further features and advantages thereof, reference is made to the following description.

Although a preferred embodiment of the present invention is described herein, it is to be understood that the invention is not limited to that precise embodiment, and that various other changes and modifications may be affected therein by one skilled in the art without departing from the scope or spirit of the invention. Furthermore, while the present invention is described with reference to specific details of particular embodiments thereof, it is not intended that such details be regarded as limitations upon the scope of the invention except insofar as and to the extent that they are included in the accompanying claims.

As used in this specification and the appended claims, the singular forms "a", "an", and "the" include plural referents unless the content clearly dictates otherwise. If not otherwise stated herein, it is to be assumed that all patents, patent applications, patent publications and other publications mentioned and cited herein are hereby fully incorporated by reference herein as if set forth in their entirety herein.

As used herein, sorption shall mean adsorption and/or absorption. And as used herein carbon-dioxide-form ion exchange resin shall mean an ion exchange resin in which a portion of the sites available for sorption comprise carbon dioxide exchangeably bound thereto.

The bead polymers according to the present invention may comprise those formed of polystyrene polymer resins comprising primary amines and crosslinked via divinylaromatics such as, for example, aminomethylated polystyrene-co-divinylbenzene (i.e., polybenzyl amine-co-divinylbenzene). Furthermore, the ion exchange resins according to the present invention may be monodisperse or heterodisperse and macroporous or gel-types (microporous). Substances are described as monodisperse in the present application in which the uniformity coefficient of the distribution curve is less than or equal to 1.2. The uniformity coefficient is the quotient of the sizes d60 and d10. d60 describes the diameter at which 60% by mass of those in the distribution curve are smaller and 40% by mass are greater or equal. d10 designates the diameter at which 10% by mass in the distribution curve are smaller and 90% by mass are greater or equal.

Monodisperse bead polymers, the precursor of the corresponding monodisperse ion exchange resin, can be produced, for example, by bringing to reaction monodisperse, if desired, encapsulated, monomer droplets consisting of a monovinylaromatic compound, a polyvinylaromatic compound, and an initiator or initiator mixture, and if appropriate a porogen in aqueous suspension. To obtain macroporous bead polymers for producing macroporous ion exchangers, the presence of porogen is utilized.

The various production processes of monodisperse bead polymers both by the jetting principle and by the seed-feed principle are known to those skilled in the art. Reference is made to U.S. Pat. No. 4,444,961, EP-A 0 046 535, U.S. Pat. No. 4,419,245 and WO 93/12167, herein incorporated by reference.

Monovinylaromatic unsaturated compounds used according to the invention comprise compounds such as styrene, vinyltoluene, ethylstyrene, alpha-methylstyrene, chlorostyrene or chloromethylstyrene. Polyvinylaromatic compounds (crosslinkers) used include divinyl-bearing aliphatic or aromatic compounds. For example, use is made of divinylbenzene, divinyltoluene, trivinylbenzene, ethylene glycol dimethacrylate, trimethylol propane trimethacrylate, hexa-1,5-diene, octa-1,7-diene, 2,5-dimethyl-1,5-hexadiene and also divinyl ether.

In addition to the use of aromatic monomers as the starting material for the polymeric ion exchange resin (for example, vinyl and vinylidene derivatives of benzene and of naphthalene (vinylnaphthalene, vinyltoluene, ethylstyrene, alpha-methyl-styrene, chlorostyrenes, and styrene), various non-aromatic vinyl and vinylidene compounds may also be employed. For example, acrylic acid, methacrylic acid, $C_1$-$C_8$ alkyl acrylates, $C_8$ alkyl methacrylates, acrylonitrile, methacrylonitrile, acrylamide, methacrylamide, vinyl chloride, vinylidene chloride, and vinyl acetate.

The subsequent functionalization of the bead polymer ion exchange resin thereby provides a functionalized ion exchange resin that is also generally known to those skilled in the art. For example, US 2006/0173083, hereby incorporated by reference, describes a process for producing monodisperse, macroporous ion exchangers having weakly basic primary amine groups by what is termed the phthalimide process, comprising: a) reacting monomer droplets of at least one monovinylaromatic compound and at least one polyvinylaromatic compound and also a porogen and an initiator or an initiator combination to give a monodisperse crosslinked bead polymer, b) amidomethylating this monodisperse crosslinked bead polymer with phthalimide derivatives, and c) reacting the amidomethylated bead polymer to give a basic ion exchanger having aminomethyl groups in the form of primary amine groups.

A primary amine ion exchanger according to the invention may be produced by the above phthalimide addition process or by the chloromethylation process. As is generally known, the chloromethylation process is one in which a chloromethylate is formed that is subsequently reacted with amines to form an aminomethylated polymer. In one embodiment of the invention, the phthalimide addition process is utilized to produce the ion exchange resin. As a result of the phthalimide addition process for the production of the ion exchange resin, secondary crosslinking is limited as compared to the chloromethylation process. Such secondary crosslinking may occur during the chloromethylation process in which the primary amines of the aminomethylated polymer react to form secondary amines (secondary crosslinking). In one embodiment of the invention, such secondary crosslinking is less than 30% of the formed polymer, and in another embodiment such secondary crosslinking is less than 10%. In yet another embodiment, the secondary crosslinking is less than 5%.

The particle size of the bead polymer formed in the production processes, including those provided above, for example, may be set during polymerization, as well as the bead polymers sphericity. In one embodiment, bead polymers having a mean particle size of approximately 10 to 1000 µm are utilized. In another embodiment of the present invention, a mean particle size of approximately from 100 to 1000 µm is employed. In yet another embodiment, a mean particle size of approximately 100 to 700 µm is used. Further, the bead polymer of the invention may take the form of spherical polymer beads or non-spherical beads (or blocks). In one embodiment, spherical polymer beads are formed.

In one embodiment, the ion exchange resin utilized is a crosslinked, weakly basic, monodisperse, macroporous, spherical, anion exchange polystyrene based resin being functionalized with primary amine groups produced by the phthalimide addition process, for example that which is commercially available from LANXESS Deutschland GmbH under the brand name LEWATIT® VP OC1065.

In one embodiment of the present invention, the aforementioned ion exchange resin is contacted with a gas or gaseous stream comprising carbon dioxide resulting in the sorption of a portion of the carbon dioxide from the gas or gaseous stream and, thereby, reducing the amount of carbon dioxide in the gas or gaseous stream. Industrial sources are of particular applicability for the present invention.

Various areas for application of the present method of carbon dioxide removal from gas streams are made up of a myriad of processes, which may include such gas and gas streams from industrial sources. Industrial gas and/or industrial gas streams may comprise, inter alia, those of or from flue gas streams, hydrocarbon combustion gas streams, natural gas, produced gas, cracked gas, and synthesis gas streams.

For simplicity, the areas may be broadly divided into energy production and chemical processes. Regarding energy production there is contemplated herein the removal of carbon dioxide found in flue gas produced from electricity generation (for example, steam boilers and combined cycle gas turbines) and steam production for industrial purposes (for example, steam heat and steam turbine drives). Large volumes of hydrocarbon fuel sources, such as coal, petroleum liquids and natural gas, are burned to produce heat and power. The combustion of hydrocarbons with air results in the release of carbon dioxide as a constituent of flue gas into the atmosphere. Illustratively, flue gas from combustion of coal may contain around 15% (by volume) carbon dioxide along with water vapor, nitrogen and other components. While still significant, slightly lower carbon dioxide levels will generally be contained in flue gas from combustion of petroleum liquids and natural gas as a result of their chemical make up.

Another broad energy production area of applicability of the subject invention is the removal of carbon dioxide from natural gas and produced gas. As appreciated by those skilled in the art, natural gas as it is removed from the well may contain varying amounts of carbon dioxide depending upon the well and the methods of enhancing natural gas production. It may often be desirable to reduce the amount of carbon dioxide from the raw natural gas, for example, as a way of meeting heat content specifications. In an embodiment of the present invention, there is disclosed a method of carbon dioxide reduction of natural gas via contacting the same with the ion exchange resin of the invention. This process also avoids introducing water vapor to the treated natural gas. As is understood by the skilled artisan, natural gas that is co-produced with petroleum may have much higher concentrations of carbon dioxide either naturally or as a result of enhanced oil recovery techniques that introduce steam and carbon dioxide into the oil well. In many chemical and refinery operations, carbon dioxide is a contaminant that must be removed from various gases, processes and gas streams. Without limitation, several embodiments are readily recognized. For example, in chemical facilities dedicated to producing light olefins, such as ethylene and propylene, carbon dioxide is found in the process gas (normally designated as cracked gas) from the process furnaces where predominantly paraffinic hydrocarbons are thermally cracked with steam to produce unsaturated hydrocarbons. The production of high quality products from these olefins manufacturing plants involves high pressures and low temperatures. In such operations, carbon dioxide in the process gas may cause process inefficiencies and poor product quality if not removed. Broadly, current practices make use of various alkanol amines in the removal of carbon dioxide and other acid gases from the process gas. The instant invention may be used in replace of or in combination with such prior uses. Similarly, in refineries where petroleum is "cracked," thermally and catalytically, carbon dioxide can be present and accumulated in the off gas streams. Upgrading these gases to produce quality products involves carbon dioxide removal where, again, the utilization of the invention may be made.

Another example of a chemical operation to which Applicant's inventive carbon dioxide removal processes may be employed is the production of synthesis gas during the manufacture of ammonia and other valuable products such as, for example, alcohols, aldehydes and other oxygenates. Synthesis gas is generally produced by the partial oxidation of hydrocarbons into hydrogen and carbon monoxide. Such partial oxidation may utilize air, steam or pure oxygen as sources of reactant oxygen and the process may be catalyzed or not. In some operations, additional steam is added to produce additional hydrogen by converting carbon monoxide to carbon dioxide and, concurrently, steam to hydrogen. In all cases, the raw synthesis gas will contain carbon dioxide that must be removed or reduced. Heretofore, the general removal of carbon dioxide was by means of alkanol amines. Instantly, the present invention may be utilized in which the ion exchange resins are used to remove and/or reduce the carbon dioxide. As may be appreciated, other processes may exist, especially in industrial settings, which require the removal of carbon dioxide from a gas, gaseous stream, or other environment. As such, the use of the presently disclosed ion exchange resin in accord with the above stated principles related thereto may be employed.

While it can be appreciated that the concentration of carbon dioxide in such industrial processes may vary greatly, in the aforementioned industrial gases and gas streams, carbon dioxide generally comprises an appreciable part of the total gas and/or gas stream. Illustratively, produced natural gas from oil wells employing enhanced oil recovery techniques may contain around 40% (v/v) carbon dioxide. Flue gas streams, for example from boilers, may contain carbon dioxide being around 15% (v/v) of the gas stream. In some other chemical processes, carbon dioxide may be undesirable in as little amount as from 1 to 2% (v/v), thus requiring its removal and/or reduction.

In one embodiment of the present invention, the use of the ion exchange for the reduction of carbon dioxide is employed in an industrial gas and/or gas stream in which the carbon dioxide has a partial pressure above 0.05 kilopascals (kPA). Industrial application of the subject invention is to broadly include systems in which the carbon dioxide concentration is about ten times the concentration of carbon dioxide in a non-industrial application, such as, for example, in the purification of air in a closed environment for human breathing.

A non-limiting example of the suspected reaction of an aminoalkylated polymer and carbon dioxide can be represented as follows wherein a poly-benzylamine material is reacted with carbon dioxide yielding a poly-benzylcarbamic acid compound:

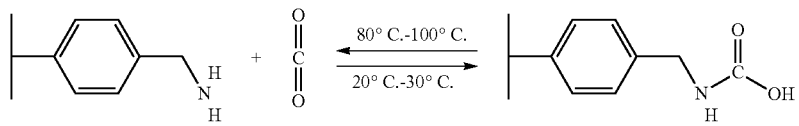

The primary amine ion exchange resin of the present invention can be used in fixed or fluidized beds and can be regenerated to a carbon dioxide lean condition through use of heat (designated as thermal swing adsorption (TSA)), vacuum (designated as pressure swing adsorption (PSA)) and/or a combination of heat and vacuum.

It has also been found that the use of partially dried primary amine ion exchange resin may have a greater ability to adsorb gaseous carbon dioxide and subsequently reduce regeneration energy requirements. While, as best understood, water does not take part in the above disclosed reaction, completely drying the ion exchange material can negatively affect the performance and thus an optimum moisture content may be employed.

Without being limited to any particular theory, completely drying the primary amine ion exchange resin may cause the micropores of the material to collapse, thereby, effectively stopping the resin's ability to adsorb carbon dioxide. Sorption performance, however, returns when the resin beads are rehydrated to between 5% by weight and 10% by weight water content, based on the total weight of the resin. Increasing the water content above 10% by weight does not enhance microporosity and unnecessarily increases regeneration heat requirements.

The poly-benzylcarbamic acid compound of the reaction disclosed above is found to be unstable at slightly elevated temperatures. While a modicum amount of captured carbon dioxide can be recovered from the saturated primary amine ion exchange resin by reducing pressure, more efficient desorption can be effected by the application of heat, thereby raising the saturated resin temperature to approximately 100° C. At which point captured carbon dioxide will return to the gas phase within and around the resin beads and thence flow to an area of lower pressure. Greater pressure difference between the gas surrounding the warm resin beads and the down stream carbon dioxide dispersal area will increase the desorption efficiency and reduce the time required for regeneration. Hence, thermal swing operation supplemented with pressure swing adsorption constitutes the optimal process for carbon dioxide sorption.

It should be appreciated, that the particle size, particle size distribution, and sphericity of the ion exchange resins are all factors that may be varied to contribute to optimal performance with respect to adsorption and desorption kinetics, as well as hydraulic characteristics in industrial applications. In the complete process comprising a sorption vessel and a desorption vessel, one may be a fixed bed and the other may be a fluidized bed. In this specific case, the particle size, particle size distribution and sphericity of the ion exchange resin utilized may depend upon process design and economic requirements.

In an embodiment of the present invention there is disclosed the need to dry the adsorbent prior to its use. For example, it may be understood from the above illustrative reaction that the poly-benzylamine material can be regenerated with heat, thus lending itself to thermal swing adsorption. Heat requirements for regeneration of the resin are low due to the physical and chemical nature of the resin. On a weight basis, the resin will have roughly one quarter the heat requirements of water for a given temperature rise. Subsequently, a wet resin will require a greater amount of energy for regeneration because of the thermal requirements of water.

I claim:

1. A process for removing carbon dioxide from a carbon dioxide containing gas stream, comprising:
   providing a benzyl amine-co-polystyrene based ion exchange resin produced by a phthalimide addition process,
   contacting said ion exchange resin with said carbon dioxide containing gas stream,
   sorbing a portion of said carbon dioxide from the carbon dioxide containing gas stream by the ion exchange resin, thereby forming a carbon-dioxide-form ion exchange resin, and
   desorbing the attached carbon dioxide from the carbon-dioxide-form ion exchange resin, thereby increasing the capacity of the resin to re-adsorb carbon dioxide.

2. The process according to claim 1, wherein the carbon dioxide containing gas stream is an industrial gas and/or industrial gas stream.

3. The process according to claim 2, wherein the industrial gas and/or industrial gas stream is selected from the group consisting of flue gas streams, hydrocarbon combustion gas streams, natural gas, produced gas, cracked gas, and synthesis gas streams.

4. The process according to claim 1, wherein the carbon dioxide has a partial pressure of greater than 0.5 kPA.

5. The process according to claim 1, wherein the carbon dioxide sorbing and desorbing steps are primarily thermal swing driven operation steps.

6. The process according to claim 1, wherein the carbon dioxide sorbing and desorbing steps are driven by a thermal swing operation in combination with a pressure swing operation.

7. The process according to claim 1, wherein said ion exchange resin has a water content between about 1% by weight and 25% by weight, based on the total weight of the resin.

8. The process according to claim 1, wherein said ion exchange resin has a water content of greater than about 5% by weight and less than about 15% by weight, based on the total weight of the resin.

9. The process according to claim 1, wherein the ion exchange resin comprises beads having a mean particle size of approximately 10 to 1000 µm.

10. The process according to claim 1, wherein the ion exchange resin comprises beads having a mean particle size of approximately 100 to 1000 µm.

11. The process according to claim 1, wherein the ion exchange resin comprises beads having a mean particle size of approximately 100 to 700 µm.

12. The process according to claim 1, wherein the ion exchange resin comprises beads having a uniformity coefficient of the distribution less than or equal to 1.2.

* * * * *